July 17, 1962 B. R. RAWDING 3,044,290
MECHANICAL RESONANCE INDICATORS
Filed Aug. 28, 1957

INVENTOR
BURTON R. RAWDING
By Elmer J. Gorn
ATTORNEY

United States Patent Office 3,044,290
Patented July 17, 1962

3,044,290
MECHANICAL RESONANCE INDICATORS
Burton R. Rawding, Walpole, Mass., assignor to Raytheon Company, a corporation of Delaware
Filed Aug. 28, 1957, Ser. No. 680,750
6 Claims. (Cl. 73—67.2)

This invention relates, in general, to resonance indicators and particularly to electronic devices used to indicate the mechanical resonance of ferromagnetic transducers.

Mechanical resonance of a transducer can be indicated by visual, auditory or sensory means. Generally, sensory means, that is, means which require the use of the sense of touch, provide very inexact results because human touch perception cannot easily distinguish an exact point at which an amplitude of oscillation reaches a maximum value. This is especially true when amplitudes are small as in many types of transducers. In many applications, auditory perception may not be feasible because the surrounding areas may be too noisy or an easy, efficient auditory method may not be conveniently incorporated in the equipment that uses the transducer system. Direct visual perception of mechanical resonance may also be quite difficult to achieve as the amplitude changes involved may be too small to be accurately distinguished by the naked eye.

Figure 3:
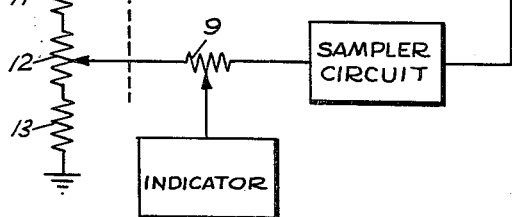

The method described by this invention involves an indirect visual indication that offers a simple method of observation and requires a very small amount of training to operate. One embodiment of the invention makes use of a "magic-eye" indicator tube of the 6E5 or 6U5 variety which presents a fluorescent screen pattern in the shape of a ring of light. A control grid inserted between the cathode and the target screen of the tube is used to control the flow of electrons to the screen. When the control grid is at a lower potential than the screen a shadow is created on the ring of light, the angle of the shadow being proportional to the value of the control grid voltage. The control grid voltage is determined in this invention by the comparison of a sample of the excitation voltage supplied by an A.-C. power amplifier to the transducer, whose mechanical resonance is being indicated, with a voltage whose value can be set so as to provide a zero control-grid voltage when the transducer is not at a point of mechanical resonance. When the transducer is not at a point of resonance the angular shadow on the screen opens to approximately 90° to indicate a lack of resonance. When resonance occurs, the voltage on the control grid changes so as to cause the angular shadow to close to 0° to indicate the fact that resonance has been reached. The operation of this indicator system can be described best with the help of the accompanying drawing in which FIG. 1 shows a particular embodiment of this invention, FIG. 2 shows a schematic of the output stage of the A.-C. power amplifier and a portion of the voltage comparison circuit used in indicating resonance and FIG. 3 shows a portion of another embodiment of the invention.

Figure 1:
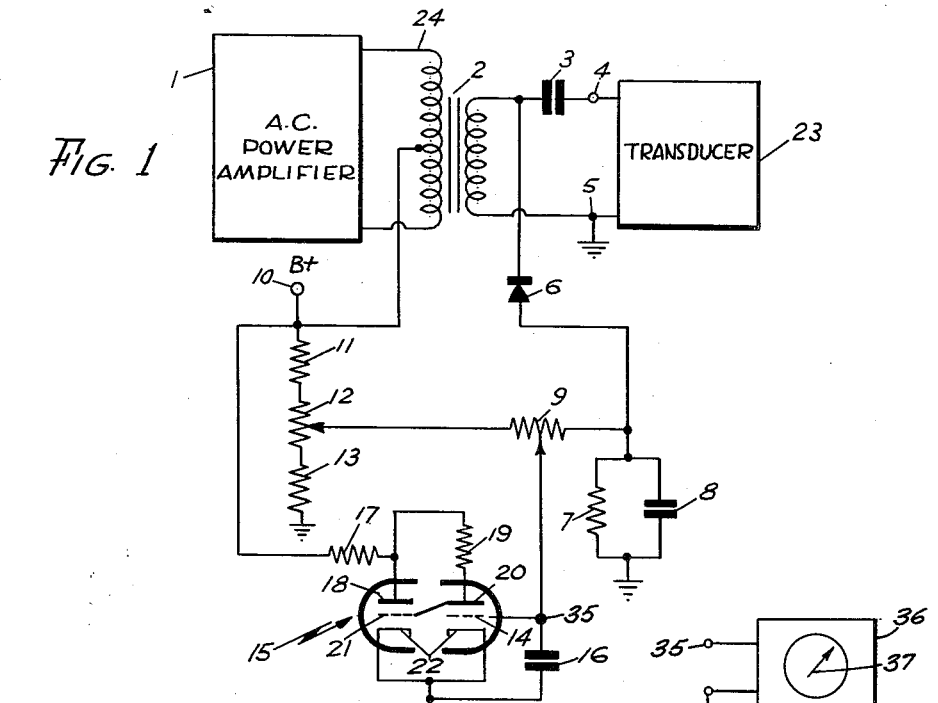
Figure 2:
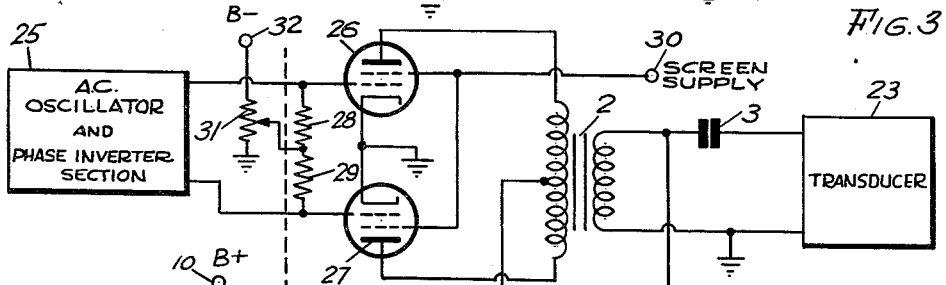

In FIG. 1, the output of an A.-C. power amplifier 1, used to excite a transducer, is connected to the primary 24 of transformer 2. The alternating current frequency of the A.-C. power amplifier may be in the ultrasonic region, for example, at 25,000 cycles, but need not necessarily be limited to that particular region of frequency. One side of the secondary of transformer 2 is connected to a capacitor 3 and thence to an output terminal 4. The other side of the secondary of transformer 2 is connected to a second output terminal 5 which is grounded. The output terminals 4 and 5 are connected to a transducer 23. Transducer 23, for example, may be a transducer of the type described in U.S. Patent No. 2,632,858 to C. L. Calosi, patented March 24, 1953. The transducer described in that patent shows a driving means which consists of a stack of thin laminae of nickel and coils of wire wound thereon. The wire coils are energized with polarizing direct current and alternating current of the proper frequency, thereby causing the laminae to undergo alternate expansions and contractions. The driving means is operated at mechanical resonance at its natural frequency, which may be, for example, in the ultrasonic region at approximately 25,000 cycles. The driving means is connected to a vibratory element and sets the vibrating element into vibration. In FIG. 1 the output terminals 4 and 5 are connected to the coils of wire that are wound on the laminae of nickel and provide the A.-C. excitation for ultimately producing the vibration. Capacitor 3 is selected so that the electrical inductance of the transducer resonates when the transducer is at mechanical resonance in its fundamental mode.

The high side of the secondary of the transformer is also connected to a voltage sampler circuit consisting of rectifier 6, resistor 7, and capacitor 8. In the diagram the direction of the arrow in rectifier 6 indicates current flow direction. Rectifier 6 is used to obtain a negative sample of the transducer input voltage. The sample of negative voltage is applied across the combination of resistor 7 and capacitor 8 to ground. The upper end of this resistor-capacitor combination is tied to one end of variable balancing resistor 9. A source 10 of B+ D.-C. voltage is applied across a series combination of resistors 11, 12, and 13 to ground. Resistor 12 is a variable resistor and its variable arm is tied to the other end of variable balancing resistor 9. The variable arm of variable resistor 9, the position of which may be varied by a screwdriver adjustment, is connected to an indicator such as a "magic-eye" tube 15 of the 6U5 or 6E5 type. The variable arm of variable resistor 9 is connected to the input grid of the triode section of tube 15. The bias voltage at the grid is developed across condenser 16 which is connected from grid 14 to ground.

The source 10 of B+ voltage is connected through resistor 17 to the fluorescent screen target 18 of the cathode ray section of tube 15 and from target 18 through plate resistor 19 to the anode 20 of the triode amplifier section of tube 15. The anode 20 is directly connected, internally to the tube, to the control grid 21 of the cathode ray section of tube 15. The common cathode 22 of tube 15 is connected directly to ground.

When the transducer is vibrating at any frequency other than the frequency at which the transducer mechanically resonates, a certain voltage is obtained at the transducer input terminals at the secondary side of transformer 2. During the negative half cycles of the input voltage, the rectifier 6 conducts and a rectified voltage is generated across the resistor 7 and condenser 8 combination. The condenser 8 smoothes out the negative sample of voltage to provide a D.-C. voltage at one side of the variable balancing resistor 9. This voltage causes a current to flow through a portion of variable resistor 9 and its variable arm to the grid 14 of tube 15. The D.-C. voltage that is picked off at the variable arm of variable resistance 12 also causes a current to flow through a portion of variable resistance 9 and, thence through its variable arm to the grid 14 of tube 15. The current, thus caused, flows in a direction opposite to that current caused by the negative sample of transducer input voltage through the variable arm path common to both currents. If the variable arms of resistors 9 and 12 are adjusted so that these currents just balance out, a zero voltage can be made to occur at the grid 14 of the triode amplifier section of tube 15 when the transducer is not at resonance.

For a zero triode grid voltage the triode section of the tube conducts and, thereby, causes a voltage drop across resistor 19. The control grid 21 is thus maintained at a negative potential with respect to the target 18 and a shadow is caused to appear in the ring of light on the fluorescent screen target. The angle of the shadow is approximately 90° for a 6E5 or 6U5 tube at zero triode grid voltage.

When the frequency of the transducer is at a point of mechanical resonance, electrical resonance also occurs at the transformer and a large negative sample of input voltage is obtained at the rectifier and an unbalance in currents occurs at the variable arm of resistance 9, changing the voltage at grid 14 in the negative direction. When the grid 14 is negative with respect to the cathode, the triode section of tube 15 becomes non-conducting. Since no current exists through the triode section, no voltage drop occurs across plate resistor 19, and the control grid 21 is essentially at the same potential as the target 18. The shadow angle, thus, reduces to 0° and the fluorescent screen pattern shows up as an unshadowed, continuous ring of light, indicating in a distinctly visual manner the point at which mechanical resonance of the transducer occurs.

The power output of the transducer may be changed according to the desires of the operator by changing the value of the grid bias on the output tubes of the power amplifier 1. The output section of the power amplifier is shown in FIG. 2. In that figure the output stage is fed by oscillator and phase inverter section 25 at the grids of output tubes 26 and 27. The plates of tubes 26 and 27 are connected to B+ source 10 through the tapped primary winding 24 of output transformer 2. The grids of those tubes are biased by means of biasing resistors 28 and 29 in conjunction with variable resistor 31 which is connected to a source 32 of B− voltage. If the power level of the power amplifier is varied by changing resistor 31, the voltage level changes at the output of the secondary of transformer 2. A change in the voltage level at the output of the transformer requires a change in the voltage level at the reference end of balancing resistor 9. To accomplish this, the variable resistor 12 is ganged with the variable resistor 31 in the power amplifier as indicated by the dashed line in FIG. 2. The balancing voltage necessary at the balancing resistor 9 is adjusted, therefore, in accordance with the output power. Thus, the proper balance can be maintained for operation over a wide range of voltage levels occurring at the excitation windings of the transducer.

The figures do not represent the only embodiments of this invention. In the figures, any suitable recording device visible to the eye, for instance, a meter, may be substituted for the "magic-eye" tube as shown in FIG. 3 wherein a meter 36 having a needle 37 is connected between the variable tap of resistor 9 at terminal 35 and ground. The rectifier may be a diode, a crystal, or any other unidirectional component. A positive sample of excitation voltage may be used in the comparison circuit. The variable resistor used to supply the reference balancing voltage may be set independent of the variable grid-bias resistor in the output stage of the A.-C. power amplifier. Frequencies outside the ultrasonic region may also be used to excite the coils of the transducer. Accordingly, it is desired that this invention not be limited to the particular embodiments shown in the drawing and described herein except as defined in the appended claims.

What is claimed is:

1. A mechanical resonance indicator comprising, in combination, an excitation source for producing an alternating voltage the frequency of which can be varied over a particular range, a transducer coupled through a condenser to said excitation source for producing mechanical motion in response to said alternating voltage, the frequency range of said source including the mechanical resonance frequency of said transducer, said condenser and said transducer providing a tuned circuit having an electrical resonance at substantially the same frequency as the mechanical resonance of said transducer, a rectifier coupled to said tuned circuit for producing a first direct voltage which is a sample of said tuned circuit voltage, a reference source for supplying a second direct voltage, an adjustable comparison means coupled to said rectifier and to said reference source for producing a third direct voltage having one value when said transducer is at mechanical resonance and another value when said transducer is off mechanical resonance, and visual means for indicating which of said values of said third direct voltage is present.

2. A mechanical resonance indicator comprising, in combination, an excitation source for producing an alternating voltage the frequency of which can be varied over a particular range, a transducer coupled to said excitation source for producing a reciprocating mechanical motion in response to said alternating voltage, the frequency range of said source including the mechanical resonance frequency of said transducer, condenser means connected to said transducer to provide a tuned circuit having its electrical resonance at the same frequency as the mechanical resonance of said transducer, a rectifier coupled to said tuned circuit for generating a first direct voltage which is a sample of said tuned circuit voltage, a reference source for supplying a second direct voltage, comparison means connected to said rectifier and to said reference source for producing a direct current the value of which is dependent on the difference between the values of said first and said second direct voltages, and visual means for indicating the value of said direct current.

3. A mechanical resonance indicator comprising, in combination, an excitation source for producing an alternating voltage the frequency of which can be varied over a particular range, a transducer coupled through a condenser to said excitation source for producing mechanical motion in response to said alternating voltage, the frequency range of said source including the mechanical resonance frequency of said transducer, said condenser and said transducer providing a tuned circuit having an electrical resonance at substantially the same frequency as the mechanical resonance of said transducer, a rectifier coupled to said tuned circuit for producing a first direct voltage which is a sample of said tuned circuit voltage, a reference source for producing a second direct voltage, a comparison means coupled to said rectifier and to said reference source for producing a third direct voltage the value of which is substantially equal to the difference between said first and said second voltages, and visual means connected to said comparison means for producing a fluorescent screen image whose shape is dependent upon the value of said third direct voltage.

4. A mechanical resonance indicator comprising, in combination, an excitation source for producing an alternating voltage the frequency of which can be varied over a particular range, a transducer coupled through a condenser to said excitation source for producing mechanical motion in response to said alternating voltage, the frequency range of said source including the mechanical resonance frequency of said transducer, said condenser and said transducer providing a tuned circuit having an electrical resonance at substantially the same frequency as the mechanical resonance of said transducer, a rectifier coupled to said tuned circuit for producing a first direct voltage which is a sample of said tuned circuit voltage, a reference source for producing a second direct voltage, a comparison means coupled to said rectifier and to said reference source for producing a third direct voltage the value of which is substantially equal to the difference between said first and said second direct voltages, and a meter connected to said comparison means for producing a needle deflection the amplitude of which is dependent upon the value of said third direct voltage.

5. A mechanical resonance indicator comprising, in combination, an excitation source for producing an alternating voltage the frequency of which can be varied over a particular range, variable impedance means within said excitation source for changing the power output of said excitation source, a transducer coupled through a condenser to said excitation source for producing mechanical motion in response to said alternating voltage, the frequency range of said source including the mechanical resonance frequency of said transducer, said condenser and said transducer providing a tuned circuit having an electrical resonance at substantially the same frequency as the mechanical resonance of said transducer, a rectifier coupled to said tuned circuit for producing a first direct voltage which is a sample of said tuned circuit voltage, an adjustable reference source coupled to said variable impedance means for supplying a second direct voltage that is proportional to the power output of said excitation source, an adjustable comparison means coupled to said rectifier and to said adjustable reference source for producing a third direct voltage having one value when said transducer is at mechanical resonance and another value when said transducer is off mechanical resonance, and visual means for indicating which of said values of said third direct voltage is present.

6. A mechanical resonance indicator comprising, in combination, an excitation source for producing an alternating voltage the frequency of which can be varied over a particular range, variable impedance means in the output stage of said excitation source for changing the power output of said excitation source, a transducer coupled to said excitation source for producing a reciprocating mechanical motion in response to said alternating voltage, the frequency range of said source including the mechanical resonance frequency of said transducer, condenser means connected to said transducer to provide a tuned circuit having its electrical resonance at the same frequency as the mechanical resonance of said transducer, a rectifier coupled to said tuned circuit for generating a first direct voltage which is a sample of said tuned circuit voltage, an adjustable reference source coupled to said variable impedance means for supplying a second direct voltage, comparison means connected to said rectifier and to said adjustable reference source for producing a direct current the value of which is dependent on the difference between the values of said first and said second direct voltages, and visual means for indicating the value of said direct current.

References Cited in the file of this patent
UNITED STATES PATENTS

| | | |
|---|---|---|
| 2,406,982 | Zworykin et al. | Sept. 3, 1946 |
| 2,648,979 | Cornett | Aug. 18, 1953 |
| 2,729,972 | Schwidetzky | Jan. 10, 1956 |
| 2,796,756 | Yates et al. | June 25, 1957 |
| 2,857,757 | Kendig et al. | Oct. 28, 1958 |
| 2,903,886 | Renaut | Sept. 15, 1959 |
| 2,921,465 | Cook | Jan. 19, 1960 |
| 2,932,818 | Lubkin | Apr. 12, 1960 |